United States Patent
Zelig et al.

(10) Patent No.: US 7,808,931 B2
(45) Date of Patent: Oct. 5, 2010

(54) HIGH CAPACITY RING COMMUNICATION NETWORK

(75) Inventors: David Zelig, Givatayim (IL); Leon Bruckman, Petah Tiqva (IL); Ronen Solomon, Giv'atayim (IL); Gideon Agmon, Kfar-Sava (IL); Vladmir Kleiner, Yahud (IL)

(73) Assignee: Corrigent Systems Ltd., Tel Aviv (IL)

( * ) Notice: Subject to any disclaimer, the term of this patent is extended or adjusted under 35 U.S.C. 154(b) by 843 days.

(21) Appl. No.: 11/367,231

(22) Filed: Mar. 2, 2006

(65) Prior Publication Data
US 2007/0206618 A1   Sep. 6, 2007

(51) Int. Cl.
*H04L 12/28* (2006.01)
(52) U.S. Cl. ...................................... 370/258
(58) Field of Classification Search ......... 370/351–356, 370/389, 391, 394, 397, 395.43, 395.5, 395.51, 370/465, 535–538; 709/239–241
See application file for complete search history.

(56) References Cited

U.S. PATENT DOCUMENTS

| | | |
|---|---|---|
| 4,535,785 A | 8/1985 | van den Honert et al. |
| 4,602,624 A | 7/1986 | Naples et al. |
| 4,628,942 A | 12/1986 | Sweeney et al. |
| 4,702,254 A | 10/1987 | Zabara |
| 4,867,164 A | 9/1989 | Zabara |
| 5,025,807 A | 6/1991 | Zabara |
| 5,159,595 A | 10/1992 | Flanagan et al. |
| 5,188,104 A | 2/1993 | Wernicke |
| 5,199,430 A | 4/1993 | Fang |
| 5,205,285 A | 4/1993 | Baker, Jr. |
| 5,215,086 A | 6/1993 | Terry, Jr. |
| 5,263,480 A | 11/1993 | Wernicke |
| 5,282,468 A | 2/1994 | Klepinski |
| 5,299,569 A | 4/1994 | Wernicke |
| 5,307,353 A | 4/1994 | Yamashita et al. |
| 5,321,393 A | 6/1994 | Carlton et al. |

(Continued)

OTHER PUBLICATIONS

Dziong, et al., "A Framework for Bandwidth Management in ATM Networks-Aggregate Equivalent Bandwidth Estimation Approach", IEEE/ACM transactions on networking, vol. 5, No. 1, Feb. 1997.

(Continued)

*Primary Examiner*—Chirag G Shah
*Assistant Examiner*—Amarnauth Persaud
(74) *Attorney, Agent, or Firm*—Fish & Richardson P.C.

(57) ABSTRACT

A method for communication includes configuring a plurality of ring nodes to communicate over a communication network that includes two or more overlapping communication rings, each ring including two unidirectional ringlets in mutually-opposite directions. A data packet including one or more header fields is accepted at an ingress ring node. An egress ring node to which the data packet is to be forwarded by the ingress ring node is determined. A subset of the rings including one or more common rings that are connected to both the ingress and egress ring nodes is identified. A ringlet of a ring among the one or more common rings is selected responsively to a respective value of at least one of the header fields of the packet. The data packet is forwarded from the ingress ring node to the egress ring node over the selected ringlet.

29 Claims, 5 Drawing Sheets

U.S. PATENT DOCUMENTS

| | | |
|---|---|---|
| 5,335,657 A | 8/1994 | Terry, Jr. |
| 5,461,611 A | 10/1995 | Drake et al. |
| 5,540,730 A | 7/1996 | Terry, Jr. |
| 5,571,150 A | 11/1996 | Wernicke |
| 5,581,703 A | 12/1996 | Baugher et al. |
| 5,596,569 A | 1/1997 | Madonna et al. |
| 5,638,358 A | 6/1997 | Hagi et al. |
| 5,706,516 A | 1/1998 | Chang et al. |
| 5,707,400 A | 1/1998 | Terry, Jr. |
| 5,755,750 A | 5/1998 | Petruska |
| 5,925,137 A | 7/1999 | Okanoue et al. |
| 5,933,422 A | 8/1999 | Kusano et al. |
| 5,983,360 A | 11/1999 | Ugajin et al. |
| 6,021,263 A | 2/2000 | Kujoory et al. |
| 6,032,194 A | 2/2000 | Gai et al. |
| 6,169,783 B1 | 1/2001 | Brooks et al. |
| 6,205,359 B1 | 3/2001 | Boveja |
| 6,205,488 B1 | 3/2001 | Casey et al. |
| 6,233,073 B1 | 5/2001 | Bowers et al. |
| 6,246,667 B1 | 6/2001 | Ballintine et al. |
| 6,256,292 B1 | 7/2001 | Ellis et al. |
| 6,262,976 B1 | 7/2001 | McNamara |
| 6,275,493 B1 | 8/2001 | Morris et al. |
| 6,304,575 B1 | 10/2001 | Carroll et al. |
| 6,314,110 B1 | 11/2001 | Chin et al. |
| 6,330,229 B1 | 12/2001 | Jain et al. |
| 6,339,488 B1 | 1/2002 | Beshai et al. |
| 6,339,595 B1 | 1/2002 | Rekhter et al. |
| 6,359,858 B1 | 3/2002 | Smith et al. |
| 6,366,556 B1 | 4/2002 | Ballintine et al. |
| 6,370,121 B1 | 4/2002 | Hausman |
| 6,400,681 B1 | 6/2002 | Bertin et al. |
| 6,408,001 B1 | 6/2002 | Chuah et al. |
| 6,442,134 B1 | 8/2002 | Mitchell |
| 6,446,131 B1 | 9/2002 | Khansari et al. |
| 6,456,407 B1 | 9/2002 | Tammela et al. |
| 6,456,587 B2 | 9/2002 | Taniguchi |
| 6,466,985 B1 | 10/2002 | Goyal et al. |
| 6,486,988 B1 | 11/2002 | Lewis et al. |
| 6,510,141 B1 | 1/2003 | Ramfelt et al. |
| 6,560,231 B1 | 5/2003 | Kawakami et al. |
| 6,563,793 B1 | 5/2003 | Golden et al. |
| 6,584,535 B1 | 6/2003 | Ouellet et al. |
| 6,604,136 B1 | 8/2003 | Chang et al. |
| 6,624,917 B1 | 9/2003 | Paschal et al. |
| 6,625,155 B1 | 9/2003 | Dziong |
| 6,628,624 B1 | 9/2003 | Mahajan et al. |
| 6,636,478 B1 | 10/2003 | Sensel et al. |
| 6,639,893 B1 | 10/2003 | Chikenji et al. |
| 6,639,896 B1 | 10/2003 | Goode et al. |
| 6,647,008 B1 | 11/2003 | Galand et al. |
| 6,678,241 B1 | 1/2004 | Gai et al. |
| 6,680,906 B1 | 1/2004 | Nguyen |
| 6,680,912 B1 | 1/2004 | Kalman et al. |
| 6,711,125 B1 | 3/2004 | Walrand et al. |
| 6,724,880 B1 | 4/2004 | Lynch |
| 6,731,597 B1 | 5/2004 | Batchellor et al. |
| 6,757,286 B1 | 6/2004 | Stone |
| 6,760,775 B1 | 7/2004 | Anerousis et al. |
| 6,763,025 B2 | 7/2004 | Leatherbury et al. |
| 6,765,921 B1 | 7/2004 | Stacey et al. |
| 6,778,496 B1 | 8/2004 | Meempat et al. |
| 6,795,394 B1 | 9/2004 | Swinkels et al. |
| 6,801,506 B1 | 10/2004 | Dey |
| 6,820,210 B1 | 11/2004 | Daruwalla et al. |
| 6,826,158 B2 | 11/2004 | Seaman et al. |
| 6,831,932 B1 | 12/2004 | Boyle et al. |
| 6,879,559 B1 | 4/2005 | Blackmon et al. |
| 6,879,594 B1 | 4/2005 | Lee et al. |
| 6,886,043 B1 | 4/2005 | Mauger et al. |
| 6,922,394 B2 | 7/2005 | Kajiwara |
| 6,925,054 B1 | 8/2005 | Atterton et al. |
| 6,934,259 B2 | 8/2005 | Klincewicz et al. |
| 6,952,397 B2 | 10/2005 | Mor et al. |
| 6,965,612 B2 | 11/2005 | Chohan et al. |
| 6,985,447 B2 | 1/2006 | Gibson et al. |
| 6,992,975 B1 | 1/2006 | Daniel et al. |
| 7,035,279 B2 | 4/2006 | Bruckman et al. |
| 7,042,846 B2 | 5/2006 | Bauer et al. |
| 7,058,008 B1 | 6/2006 | Wilson et al. |
| 7,061,859 B2 * | 6/2006 | Barsheshet .................. 370/225 |
| 7,158,486 B2 | 1/2007 | Rhodes |
| 7,161,899 B2 | 1/2007 | Limaye et al. |
| 7,184,402 B1 | 2/2007 | Sharma et al. |
| 7,212,490 B1 * | 5/2007 | Kao et al. ................... 370/222 |
| 7,260,097 B2 | 8/2007 | Casey et al. |
| 2001/0022786 A1 | 9/2001 | King et al. |
| 2001/0033575 A1 | 10/2001 | Shimamura et al. |
| 2002/0015411 A1 | 2/2002 | Kataoka et al. |
| 2002/0018482 A1 | 2/2002 | Gotzer |
| 2002/0093949 A1 | 7/2002 | Yasue et al. |
| 2002/0176450 A1 | 11/2002 | Kong et al. |
| 2002/0179720 A1 | 12/2002 | Liva et al. |
| 2002/0181479 A1 | 12/2002 | Okuno |
| 2003/0002443 A1 | 1/2003 | Basso et al. |
| 2003/0026298 A1 | 2/2003 | Bisson et al. |
| 2003/0061338 A1 | 3/2003 | Stelliga |
| 2003/0074469 A1 | 4/2003 | Busi et al. |
| 2003/0076829 A1 | 4/2003 | Rabie et al. |
| 2003/0088698 A1 | 5/2003 | Singh et al. |
| 2003/0145108 A1 | 7/2003 | Joseph et al. |
| 2003/0147344 A1 | 8/2003 | Stewart et al. |
| 2003/0158930 A1 | 8/2003 | McBride |
| 2003/0196135 A1 | 10/2003 | Gottlieb |
| 2003/0223428 A1 | 12/2003 | Blanquer Gonzalez et al. |
| 2004/0022268 A1 | 2/2004 | Busi et al. |
| 2004/0052274 A1 | 3/2004 | Wang et al. |
| 2004/0071089 A1 | 4/2004 | Bauer et al. |
| 2004/0076176 A1 | 4/2004 | Kfir |
| 2004/0100984 A1 * | 5/2004 | Nam et al. ................... 370/438 |
| 2004/0101303 A1 | 5/2004 | Williams |
| 2004/0105459 A1 | 6/2004 | Mannam |
| 2004/0196787 A1 | 10/2004 | Wang et al. |
| 2004/0202171 A1 | 10/2004 | Hama |
| 2005/0030948 A1 | 2/2005 | Wyatt |
| 2005/0135436 A1 | 6/2005 | Nigam et al. |
| 2005/0265365 A1 * | 12/2005 | Wan .......................... 370/401 |
| 2006/0078332 A1 * | 4/2006 | Fang et al. .................... 398/19 |
| 2006/0101158 A1 * | 5/2006 | Shand et al. ................. 709/239 |
| 2007/0058572 A1 * | 3/2007 | Clauberg .................... 370/258 |
| 2007/0064700 A1 * | 3/2007 | Holness ..................... 370/392 |
| 2007/0140248 A1 * | 6/2007 | Guo et al. ................... 370/392 |

OTHER PUBLICATIONS

Inverse Multiplexing over ATM, Strategic Technologies Group, Jul. 12, 2001.

The PPP Multilink Protocol (MP) Standard, RFC 1990, The Internet Engineering Task Force, www.ietf.org, Aug. 1996.

Martini, et al., in an IETF Draft Entitled: "Encapsulation Methods for transport of layer 2 Frames over MPLS", May 2001. (Available at: search.ietf.org/internetdrafts/draft-martini-12circuit-encap-mpls-02.txt.).

Rosen et al., request for Comments (RFC) 3032 of the Internet Engineering Task Force (IETF), "MPLS Label Stacking Encoding", Jan. 2001.

Awduche, et al., "Requirement for Traffic Engineering Over MPLS", published as IETF RFC 2702, Sep. 1999.

Deering, RFC 1112, " Host Extensions for IP Multicasting", Aug. 1989.

Lasserre et al., in "Virtual Private LAN Services over MPLS" (IETF darft-lasserre-vkompella-ppvpn-vpls-02.txt, Jun. 2002 and Jan. 2003.

"SONET Bidirectional Line-Switched Ring Equipment Generic Criteria", A Module of TSGR, FR-440, GR-1230-CORE, by Bellcore, Issue 4, Dec. 1998.

Baker, et al, in IETF RFC 1638, "PPP Bridging COntrol Protocol (BCP)" Jun. 1994.

Kompella, et al., "Virtual Private LAN Service" IETF draft-ietf-l2vpn-vpls-bgp-02.txt, May 2004.

IEEE standard 802.17, "Part 17: Resilient Packet Ring (RPR) Acess Method & Physical Layer Specifications" RPR Alliance 2002, 2003.

"Scaling RPR with multiple rings: one control plane multiple transit paths" presented at the IEEE 802.17 working group meeting, Portland Oregan, Jul. 10, 2001.

Bradley, et al., in IETF RFC 1490, "Multiprotocol Interconnect over Frame Relay" Jul. 1993.

* cited by examiner

HIGH CAPACITY RING COMMUNICATION NETWORK

FIELD OF THE INVENTION

The present invention relates generally to communication networks, and particularly to methods and systems for providing high network capacity using link aggregation over multiple rings.

BACKGROUND OF THE INVENTION

Communication networks sometimes employ ring configurations. For example, some networks comprise Resilient Packet Ring (RPR) configurations, as defined by the IEEE 802.17 working group. Applicable standards and additional details regarding RPR network configurations are available at www.ieee802.org/17.

Various communication services can be provided over ring networks. For example, a virtual private local area network service (VPLS) links different local area networks (LANS) together over an Internet Protocol (IP) network. VPLS methods are described, for example, by Kompella et al., in "Virtual Private LAN Service" (IETF draft-ietf-12vpn-vpls-bgp-06.txt, December, 2005) and by Lasserre et al., in "Virtual Private LAN Services over MPLS" (IETF draft-ietf-12vpn-vpls-ldp-08.txt, November, 2005), which are incorporated herein by reference. These drafts are available from the Internet Engineering Task Force (IETF) at www.ietf.org/internet-drafts.

Link aggregation (LAG) is a technique by which a group of parallel physical links between two endpoints in a data network can be joined together into a single logical link (referred to as a "LAG group"). Traffic transmitted between the endpoints is distributed among the physical links in a manner that is transparent to the clients that send and receive the traffic. For Ethernet™ networks, link aggregation is defined by Clause 43 of IEEE Standard 802.3, Carrier Sense Multiple Access with Collision Detection (CSMA/CD) Access Method and Physical Layer Specifications (2002 Edition), which is incorporated herein by reference.

A method for connecting multiple rings is described by Orava in a presentation entitled "Scaling RPR with Multiple Rings: One Control Plane Multiple Transit Paths," presented at the IEEE 802.17 working group meeting, Portland, Oreg., Jul. 10, 2001, which is incorporated herein by reference. This presentation is also available at www.ieee802.org/17/documents/presentations/jul2001/jul_2001_presentations.htm.

SUMMARY OF THE INVENTION

Embodiments of the present invention provide high capacity ring network configurations, in which multiple ring nodes communicate over two or more parallel communication rings. Each communication ring comprises two unidirectional ringlets oriented in mutually-opposite directions, such as in a RPR. Some embodiments provide methods for forwarding data packets and for managing bandwidth allocations over the high capacity ring network.

In some embodiments, the network configuration comprises an asymmetric configuration in which not all ring nodes are necessarily connected to all rings. Asymmetric configurations allow the capacity of nodes to be expanded incrementally according to demand.

According to a disclosed method, when a data packet is accepted at an ingress ring node, an appropriate egress ring node to which the data packet should be forwarded is first determined. A group of common rings that are connected to both the ingress and egress ring nodes is identified. A ringlet is selected in one of the rings belonging to the group of common rings, based on respective values of one or more header fields of the packet. In some embodiments, the appropriate ring is selected out of the group using a hashing function. The data packet is then forwarded from the ingress ring node to the egress ring node over the selected ringlet. The particular ringlet (i.e., direction) in the ring may be chosen based on the combination of a desired (preconfigured) direction, known network failures and/or a protection mode defined for the data packet.

Any suitable services or connections can be set up over the high capacity ring network, such as multi-protocol label switching (MPLS) connections or other point-to-point connections, multipoint-to-multipoint services such as VPLS, and/or any other types of network connectivity, for example IP networks and bridging networks.

There is therefore provided, in accordance with an embodiment of the present invention, a method for communication, including:

configuring a plurality of ring nodes to communicate over a communication network including two or more overlapping communication rings, each ring including two unidirectional ringlets in mutually-opposite directions;

accepting a data packet including one or more header fields at an ingress ring node;

determining an egress ring node to which the data packet is to be forwarded by the ingress ring node;

identifying a subset of the rings including one or more common rings that are connected to both the ingress and egress ring nodes;

responsively to a respective value of at least one of the header fields of the packet, selecting a ringlet of a ring among the one or more common rings; and forwarding the data packet from the ingress ring node to the egress ring node over the selected ringlet.

In an embodiment, configuring the plurality of ring nodes includes connecting at least one of the ring nodes to only part of the rings. In another embodiment, selecting the ringlet of the ring among the one or more common rings includes applying a hashing function to the respective value of the at least one of the header fields of the packet. In yet another embodiment, determining the egress node includes adaptively maintaining associations between media access control (MAC) addresses of potential destination nodes and respective egress nodes via which data packets are to be forwarded to the potential destination nodes, extracting a destination node MAC address value from the data packet and determining the egress node responsively to an association corresponding to the extracted destination node MAC address value. In still another embodiment, identifying the one or more common rings includes querying a topology of the communication network stored in a data structure in the ingress node.

In an embodiment, selecting the ringlet of the ring includes choosing a default ringlet out of the two unidirectional ringlets of the ring, and switching to the other of the two unidirectional ringlets when detecting a failure along a part of the default ringlet connecting the ingress node to the egress node. In an embodiment, switching to the other of the two unidirectional ringlets includes determining whether to switch to the other of the two unidirectional ringlets responsively to a protection mode defined for the data packet. In another embodiment, detecting the failure includes determining a first number of ring segments from the ingress node to a location of the failure and a second number of segments from the ingress node to the egress node, and determining that the failure is located between the ingress node and the egress node when the first number of segments is smaller than the second number of segments.

In an embodiment, identifying the one or more common rings and selecting the ringlet include querying at least one of a first data structure holding a reference topology of the communication network and a second data structure holding topology information regarding known failures in the communication network. Querying the at least one of the first and second data structures may include, when modifying a topology of the communication network, forwarding data packets in accordance with the first and second data structures while storing an updated reference topology in a third data structure and storing an updated topology information regarding the known failures in a fourth data structure, and forwarding subsequent data packets using the third and fourth data structures.

In another embodiment, the method further includes periodically sending from each of the ring nodes topology messages enabling other ring nodes to determine the topology of the communication network and to detect topology-related faults, each topology message including at least one of a media access control (MAC) address uniquely identifying an RPR unit assigned to a ring on which the message is sent within the ring on which the message is sent, a LAG-RPR MAC address uniquely identifying the ring node sending the topology message, an Internet protocol (IP) address uniquely identifying the communication network, and a ring number identifying the ring on which the message is sent.

In yet another embodiment, the method includes, prior to accepting the data packet, allocating bandwidth in the one or more common rings connected to both the ingress and egress ring nodes. Allocating the bandwidth may include choosing one of the two unidirectional ringlets in each of the one or more common rings having a default direction, based on available bandwidth in the ringlets of the one or more common rings.

In an embodiment, allocating the bandwidth includes:

accepting a bandwidth allocation request sent by the ingress ring node;

translating the bandwidth allocation request to one or more ring-level requests requesting bandwidth allocation in the respective one or more common rings; and allocating the bandwidth responsively to approval of the one or more ring-level requests.

There is also provided, in accordance with an embodiment of the present invention, a communication network, including:

two or more overlapping communication rings, each including two unidirectional ringlets oriented in mutually-opposite directions; and a plurality of ring nodes connected by the rings, wherein each ring node is arranged to accept a data packet including one or more header fields, to determine an egress ring node to which the data packet is to be forwarded, to identify a subset of the rings including one or more common rings that are connected to both the ring node and the egress ring node, to select, responsively to a respective value of at least one of the header fields of the packet, a ringlet of a ring among the one or more common rings, and to forward the data packet to the egress ring node over the selected ringlet.

There is additionally provided, in accordance with an embodiment of the present invention, a ring node for use in a communication network that includes two or more communication rings, each including two unidirectional ringlets oriented in mutually-opposite directions, the ring node including:

two or more line cards, which are arranged to communicate with the respective two or more communication rings; and a network processor, which is arranged to accept a data packet including one or more header fields, to determine an egress ring node to which the data packet is to be forwarded, to identify a subset of the rings including one or more common rings that are connected to both the ring node and the egress ring node, to select, responsively to a respective value of at least one of the header fields of the data packet, a ringlet of a ring among the one or more common rings, and to forward the data packet to the egress ring node over the selected ringlet.

The present invention will be more fully understood from the following detailed description of the embodiments thereof, taken together with the drawings in which:

DETAILED DESCRIPTION OF EMBODIMENTS

System Description

Figure 1:
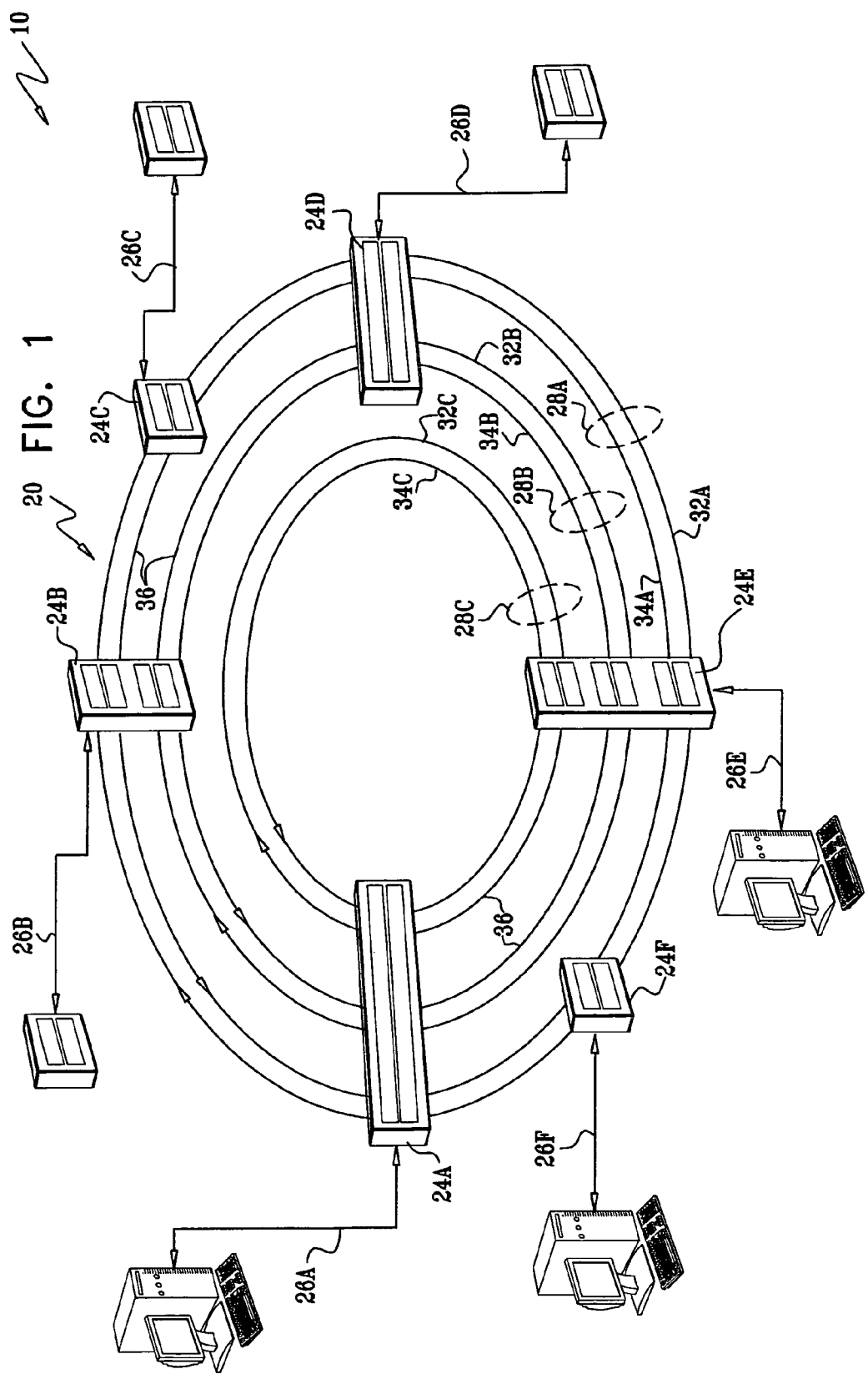
FIG. 1 is a block diagram that schematically illustrates a ring-based communication network, in accordance with an embodiment of the present invention.

FIG. 1 is a block diagram that schematically illustrates a communication network 10, in accordance with an embodiment of the present invention. Network 10 comprises, or is built around, a high capacity ring network 20. Network 20 comprises multiple ring nodes 24, also referred to as stations, arranged in a ring configuration. The exemplary network configuration of FIG. 1 comprises five nodes denoted 24A . . . 24E. Some or all of nodes 24 comprise ports 26 for exchanging data packets with communication nodes and other network elements external to ring network 20.

Each data packet traversing network 20 enters the ring network at one of ports 26A . . . 26E, referred to as an ingress port, and leaves the ring network at another one of ports 26A . . . 26E, referred to as an egress port. The ring node through which the packet enters network 20 is referred to as an ingress node, and the ring node through which the packet leaves the ring network is referred to as the egress node. Typically, data packets are associated with packet flows having a common source node and destination node, either within or outside of ring network 20.

In order to provide high network bandwidth, network 20 comprises two or more rings 28. In the exemplary configuration of FIG. 1, network 20 comprises three rings denoted 28A ... 28C. Each ring 28 comprises a resilient packet ring (RPR), as defined in the IEEE 802.17 standard cited above. Packets are distributed and forwarded over rings 28 using methods that are described below. Ring network 20 is thus referred to as a link aggregation RPR (LAG-RPR) network.

For example, if each ring 28 comprises a 10 Gbps RPR, network 20 as a whole can provide a total bandwidth of 30 Gbps. Since each ring 28 comprises a conventional RPR, the configuration of network 20 provides the higher total bandwidth without the need for high performance optical and processing components associated with such bandwidth.

Each ring 28 comprises two unidirectional ringlets oriented in mutually-opposite directions. The ringlets are referred to herein as a clockwise (CW) ringlet 32 and a counterclockwise (CCW) ringlet 34. Each ringlet comprises ring segments 36, typically comprising fiber connections, which carry the traffic from one node 24 to another. In some embodiments, although not necessarily, all segments connecting a pair of neighboring ring nodes use a single fiber-optic connection as the physical communication medium. The different rings and ringlets are multiplexed onto the fiber-optic connection, such as using wavelength division multiplexing (WDM).

In general, each node 24 may be connected to one or more of rings 28. In FIG. 1, for example, nodes 24A and 24E are connected to all three rings 28A ... 28C. Nodes 24B and 24D, on the other hand, are connected only to rings 28A and 28B, and nodes 24C and 24F are connected only to ring 28A. A ring configuration in which not all nodes are necessarily connected to all rings is referred to as an asymmetric configuration.

Asymmetric configurations allow the capacity of the network to be expanded incrementally according to demand. Nodes required to support large traffic volume can be connected to a higher number of rings to support this volume, and vice versa. In some embodiments, one of rings 28 is common to all ring nodes and is referred to herein as an anchor ring. In FIG. 1, for example, ring 28A is common to all ring nodes 24A ... 24F and can be used as a common ring.

The term "connected" is used herein to describe a certain amount of packet processing performed by the node on the packets carried by the ring and is not meant to describe a mere physical connection. In some embodiments, such as when all rings share the same fiber-optic connection as their physical communication medium, the fiber carrying all rings may be physically connected to all nodes, but each node may perform optical termination and packet processing on only part of the rings. Such a configuration is also considered an asymmetric configuration.

The configuration of FIG. 1 is an exemplary configuration chosen purely for the sake of conceptual clarity. In alternative embodiments, LAG-RPR network 20 may comprise any number of nodes 24 and rings 28. Each node 24 may be connected to any subset comprising one or more of rings 28, as appropriate.

Any suitable services or connections can be provided over LAG-RPR network 20. The configuration of network 20 as a single LAG-RPR entity is particularly suitable for multipoint-to-multipoint services such as VPLS, as it prevents the need for complex interconnect between logically-separate rings. The same benefits hold for other types of services, such as point-to-point MPLS tunnels and IP forwarding.

Figure 2:
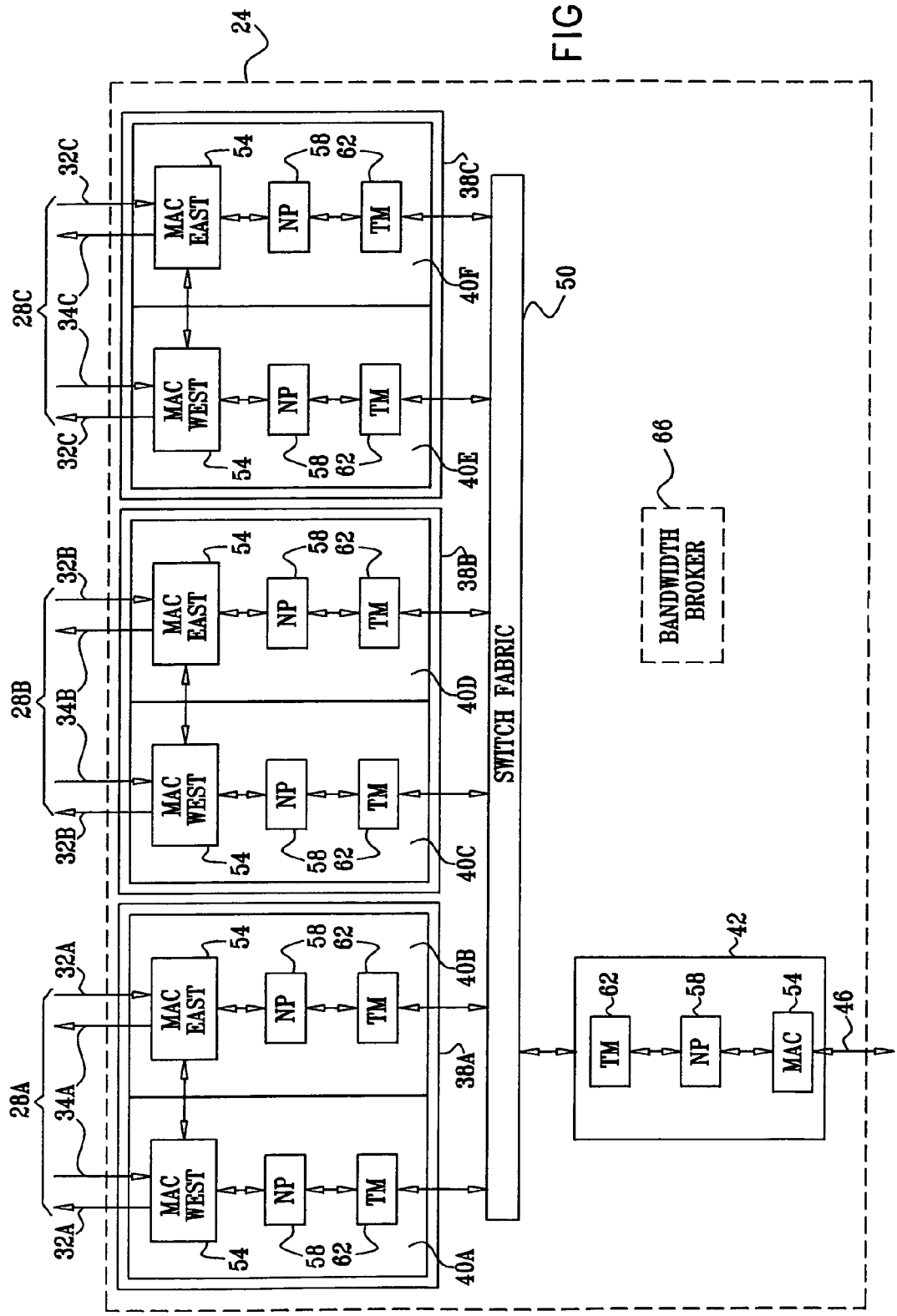
FIG. 2 is a block diagram that schematically illustrates a communication node in a high capacity ring network, in accordance with an embodiment of the present invention.

FIG. 2 is a block diagram that schematically illustrates a communication node 24 in LAG-RPR network 20, in accordance with an embodiment of the present invention. The exemplary configuration of FIG. 2 describes a node that is connected to all three rings 28A ... 28C, such as nodes 24A and 24E of FIG. 1. Node 24 comprises three RPR units 38 denoted 38A ... 38C. Each RPR unit 38 is assigned to processes the packets of a particular ring 28, i.e., units 38A ... 38C are assigned to rings 28A ... 28C, respectively. Each RPR unit processes the packets entering the ring at the particular node 24, packets leaving the ring at the node, and transit packets that only pass through the node over the ring.

In some embodiments, each RPR unit 38 comprises two line cards 40, with one line card assigned to each direction. (In a ring, each node communicates with two neighboring nodes in opposite directions. For convenience, the description that follows uses the terms "east" and "west" to refer to the two directions. This terminology is arbitrary and is unrelated to any geographical arrangement of the nodes.) For example, unit 38A handling ring 28A comprises line cards 40A and 40B. Line card 40A communicates over ring 28A with the neighbor node located to the west, handling packets that arrive over ringlet 34A and transmitting packets over ringlet 32A. Similarly, line card 40B communicates over ring 28A with the eastern neighbor node, handling packets that arrive over ringlet 32A and transmitting packets over ringlet 34A. Line cards 40C ... 40F of RPR units 38B and 38C operate in a similar manner.

Node 24 comprises an I/O line card 42, which communicates with nodes and network elements outside of ring network 20 via port 26. In some embodiments, line card 42 is similar in structure to line cards 40. Line cards 40A ... 40F and 42 communicate with one another using a switch fabric 50, typically comprising a hardware-implemented switching matrix. The node configuration of FIG. 2 is an exemplary configuration. In alternative embodiments, node 24 may comprise any number of RPR units 38, depending on the number of rings connected to the node. The node may comprise more than a single I/O line card when supporting multiple ports 26. In some embodiments, RPR unit 38 may be implemented as a single card or module, without splitting its functions between two separate line cards 40.

Each line card 40 comprises a RPR media access control (MAC) processor 54. Each MAC processor 54 interfaces with the appropriate segments 36 and performs physical layer and MAC processing functions, as defined in the IEEE 802.17 standard. RPR MAC processors are denoted MAC EAST and MAC WEST according to the direction they are assigned to handle. The MAC EAST and MAC WEST processors of each RPR unit 38 are connected to one another in order to continue forwarding data packets that transit the node to the next neighbor node in the ring.

Each line card 40 comprises a traffic manager (TM) 62, which queues the packets sent from the line card to switch fabric 50, and vice versa. Each line card 40 comprises a packet processor, such as a network processor (NP) 58. NP 58 performs higher-level processing functions with respect to packets leaving the node via port 26, and for packets entering the node via port 26 to be sent over LAG-RPR network 20. In RPR terms, NP 58 plays the role of the MAC client and may perform various routing and forwarding functions. In the context of LAG-RPR network 20, NP 58 carries out various packet forwarding and topology management methods that are described in detail hereinbelow.

In some embodiments, node 24 comprises a bandwidth broker (BWB) 66, which performs ring-level bandwidth allocation functions in the different rings, ringlets and segments of LAG-RPR network 20. These functions are sometimes referred to as connection admission control (CAC) functions.

CAC and bandwidth allocation methods in ring configurations are described, for example, in U.S. Patent Application Publication 2004/0085899 A1, whose disclosure is incorporated herein by reference. Resource reservation methods and other traffic engineering aspects in ring networks are also described in U.S. Pat. No. 6,963,537 and in U.S. Patent Application Publication 2003/0103449 A1, whose disclosures are incorporated herein by reference.

Typically, the BWB functionality is active in only one of nodes 24, i.e., only one bandwidth broker is active in the LAG-RPR network at any given time. An exemplary bandwidth management method carried out by BWB 66 is described in FIG. 6 below. In some embodiments, BWB 66 may be implemented in a client-server configuration, as shown in FIG. 7 below.

Packet Forwarding Method Description

The description that follows describes a method for forwarding data packets through LAG-RPR network 20. Consider a data packet originating from a certain source node in network 10. The packet enters LAG-RPR network 20 via port 26 of a particular ring node 24, referred to as the ingress node. The data packet is addressed to a particular destination node in network 10, either inside or outside ring network 20. In order to reach the destination node, the packet should be forwarded to a particular egress node, via which it leaves the LAG-RPR network.

Typically, the forwarding of the packet in network 20 (i.e., a decision to which egress node the packet should be sent, and which ringlet of which ring should be used for sending the packet) is determined by the NP 58 of the ingress card of the ingress node (such as, for example, NP 58 of line card 42 in FIG. 2 above). An exemplary forwarding method is described in detail in FIG. 4 below.

Figure 3:
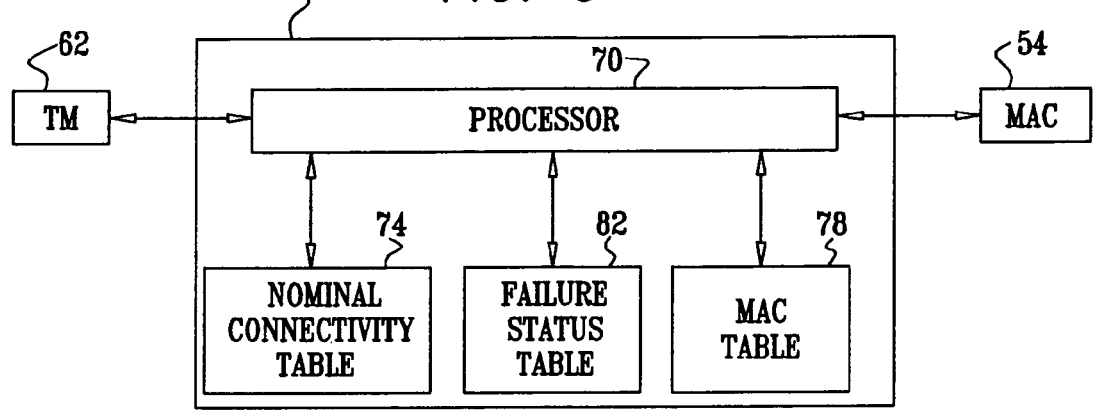
FIG. 3 is a block diagram that schematically illustrates a packet processor, in accordance with an embodiment of the present invention.

FIG. 3 is a block diagram that schematically illustrates details of network processor 58, in accordance with an embodiment of the present invention. NP 58 comprises a forwarding processor 70, which accepts data packets from MAC processor 54, determines the appropriate forwarding of the packets and sends the packets via TM 62 to fabric 50.

In some embodiments, the forwarding processor classifies the packet based on the packet headers to identify the next ring segment over which the packet should be sent. Processor 70 also determines the appropriate modifications to be performed on the packet in order to enable the next ring node to further forward the packet to its final destination. The ingress card than adds an internal header to the packet, which identifies both the appropriate traffic management functions and the desired routing through switch fabric 50.

Typically, each network processor 58 maintains look-up tables that hold information regarding the current connectivity and topology of the network. The network processor of the ingress card uses the information stored in the tables when making forwarding decisions.

In some embodiments, NP 58 comprises a nominal connectivity table 74. Table 74 is accessed by an index of the egress node. For each possible egress node out of ring nodes 24, table 74 holds a list of one or more rings 28 that are common to the ingress node and the egress node. Table 74 holds time-to-live (TTL) values, indicating the number of ring segments 36 that should be traversed in either direction (east/west), in order to reach each egress node using each of the common rings that connect the ingress and egress nodes.

For example, referring to FIG. 1 above, the network processor of the ingress card of node 24E comprises a table 74 holding the following connectivity information:

| Egress node | Common rings | TTL west | TTL east |
|---|---|---|---|
| 24A | 28A | 2 | 4 |
|  | 28B | 1 | 3 |
|  | 28C | 1 | 1 |
| 24B | 28A | 3 | 3 |
|  | 28B | 2 | 2 |
| 24C | 28A | 4 | 2 |
| 24D | 28A | 5 | 1 |
|  | 28B | 3 | 1 |

Table 74 provides the reference topological structure of RPR-LAG network 20, as seen from node 24E, assuming no ring failures exist. For example, NP 58 can learn from table 74 that node 24C can only be reached using ring 28A, and that this node is located two segments away to the east (over ringlet 32A) and four segments to the west (using ringlet 34A).

NP 58 further comprises a failure status table 82, which holds topology information regarding currently-known failures in ring segments 36. Typically, table 82 is indexed by ringlet (or, equivalently, by ring and east/west direction). For each ring and direction, the table holds a value of the TTL value indicating the number of segments traversed until the nearest failure.

In an alternative embodiment, the current topology can be stored in a single table, taking into account both the nominal topology and the currently-known failures. However, splitting the information between tables 74 and 82 significantly reduces the number of table entries that should be updated after a failure is first discovered or after a known failure is repaired. When the topology information is split in this manner, only failure status table 82 should be updated.

When multipoint-to-multipoint (MP-MP) services such as VPLS are provided over ring network 20, NP 58 comprises a MAC table 78. Table 78 holds MAC addresses of the different destination nodes to which packets may be addressed. For each destination node, table 78 holds the identity of the egress node to which packets addressed to the destination node should be forwarded. In some embodiments, the associations between destination node MAC addresses and egress nodes are learned and updated in an adaptive manner by the network processor. The handling of MAC tables in VPLS over RPR networks is described in greater detail in U.S. patent application Ser. No. 10/993,882 entitled "Virtual Private LAN Service over Ring Networks," filed Nov. 19, 2004, which is assigned to the assignee of the present patent application and whose disclosure is incorporated herein by reference.

Figure 4:
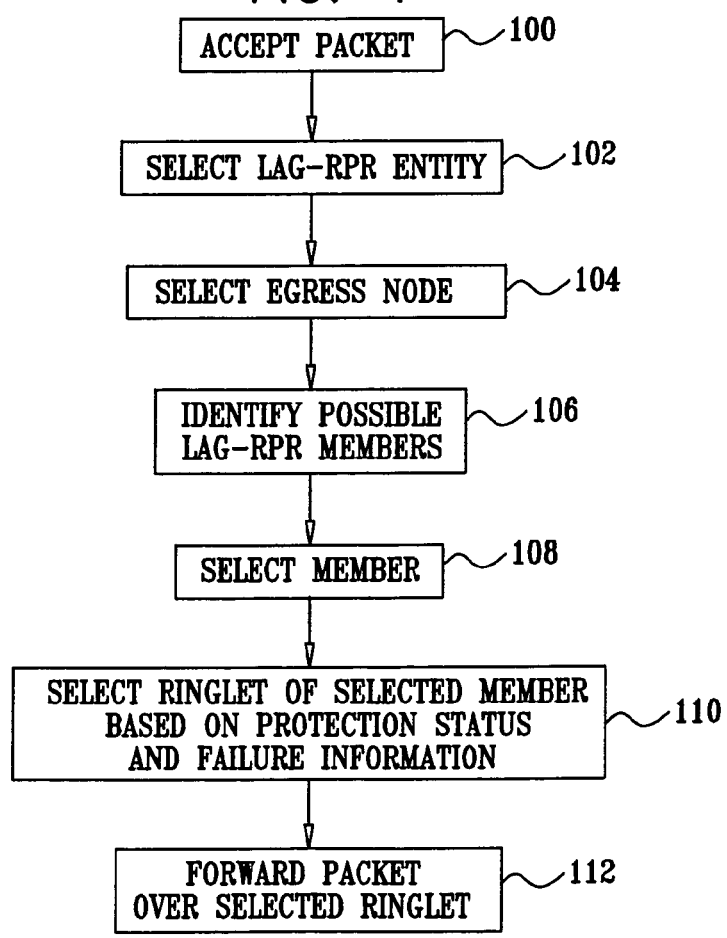
FIG. 4 is a flow chart that schematically illustrates a method for forwarding packets over a high capacity ring network, in accordance with an embodiment of the present invention.

FIG. 4 is a flow chart that schematically illustrates a method, carried out by NP 58 of the ingress card, for forwarding packets over LAG-RPR network 20, in accordance with an embodiment of the present invention. In principle, the forwarding of a particular packet can be broken into the following sequence of decisions: (1) Verify that the packet should be forwarded via LAG-RPR network 20, (2) determine the identity of the appropriate egress node to which the packet should be forwarded, (3) determine which ring 28 is to be used for forwarding the packet to the egress node and (4) select the ringlet, or east/west direction, over which the packet should be forwarded.

The method begins with NP 58 of the ingress card accepting a data packet, at a packet acceptance step 100. In some embodiments, the packet belongs to a connection that is not set up via LAG-RPR network 20. Therefore, NP 58 first verifies that the packet is to be forwarded through network 20, at a LAG-RPR selection step 102. NP 58 can identify that the packet should be forwarded via network 20 based on packet header values, or based on an association of a connection to which the packet belongs with a specific port or virtual LAN (VLAN).

NP 58 then determines the appropriate egress node (station) to which the packet should be forwarded, at an egress selection step 104. The method used by NP 58 to determine the identity of the egress node may be different for different types of services and connections. In point-to-point (P-P) connections, for example, the identity of the egress node is typically pre-configured by the system operator when setting up the connection. All packets associated with the particular connection are forwarded to the pre-selected egress node. In multipoint-to-multipoint services such as VPLS, NP 58 typically queries MAC table 78 to determine the identity of the egress node, as described above.

NP 58 now identifies a subset of rings 28 that are common to both the ingress and egress nodes, at a LAG group identification step 106. In other words, NP 58 identifies the possible rings over which the packet can be forwarded to the egress node determined at step 104 above. Typically, processor 70 of NP 58 queries table 74 to obtain the list of possible rings. In IEEE 802.3 LAG terms, the set of possible rings is referred to as a LAG group, and each ring in the group is referred to as a member. (Note that the IEEE 802.3 standard refers to P-P links, while LAG-RPR network 20 has a different connectivity, i.e., LAG membership per each egress node.)

NP 58 then selects one of the members (i.e., one of the rings common to the ingress and egress nodes) to be used for forwarding the packet, at a member selection step 108. The member selection process should typically distribute the traffic load evenly among the different rings. Additionally or alternatively, it is usually desirable that packets associated with a particular flow or micro-flow (i.e., a flow of a finer granularity than the system level connection) be forwarded over the same ring, for example to avoid re-ordering of packets of the same application.

In some embodiments, NP 58 determines the selected member by applying a hashing function to the values of one or more header fields of the packet. Any suitable hashing function known in the art can be used for this purpose. Any suitable header field or combination of fields can be used in the hashing operation, such as, for example, a source MAC address of the source node, a destination MAC address of the destination node, an IP address of the source node, an IP address of the destination node, a transmission control protocol (TCP) port number and a user datagram protocol (UDP) port number. Since packets associated with a certain flow typically share the same header field values, hashing these header fields will cause such packets to be forwarded over the same ring 28, thus avoiding packet miss-ordering within the flow that may not be tolerated by the applications running over this flow.

Although the hashing function may distribute the traffic uniformly among the rings common to particular pair of ingress and egress nodes, the overall traffic over segments 36 may be distributed unevenly because of the asymmetric structure of LAG-RPR network 20. In such cases, a non-uniform or weighted hashing function can be used to balance the traffic load across all segments 36. Weighting information, such as weighting coefficients corresponding to the different segments 36 may be stored in connectivity table 74.

At this stage, NP 58 determined the identity of the egress node and the ring to be used for forwarding the packet to the egress node. The NP now selects the ringlet (or, equivalently, the east or west direction) for forwarding the packet, at a direction selection step 110. Typically, a default direction setting is pre-configured for each connection. In MP-MP service such as VPLS, the default direction setting is often stored in MAC table 78. In P-P connections, the default direction is typically stored in a classification table that associates each P-P connection with its respective destination node. NP 58 may deviate from the default setting when failures occur in network 20, taking into account the protection mode defined for the packet. An exemplary method of selecting the direction based on known failures in the network and on the applicable protection mode is described in FIG. 5 below.

In some embodiments, NP 58 queries failure status table 82 to determine whether any failures exist en-route to the egress node along the default direction. If no failure is found, NP 58 selects the default direction. If a failure is found, the NP selects the opposite direction. NP 58 then forwards the packet to the appropriate line card, to be sent in the selected direction (ringlet) of the selected member (ring) of the LAG-RPR network to the selected egress node, at a forwarding step 112.

Figure 5:
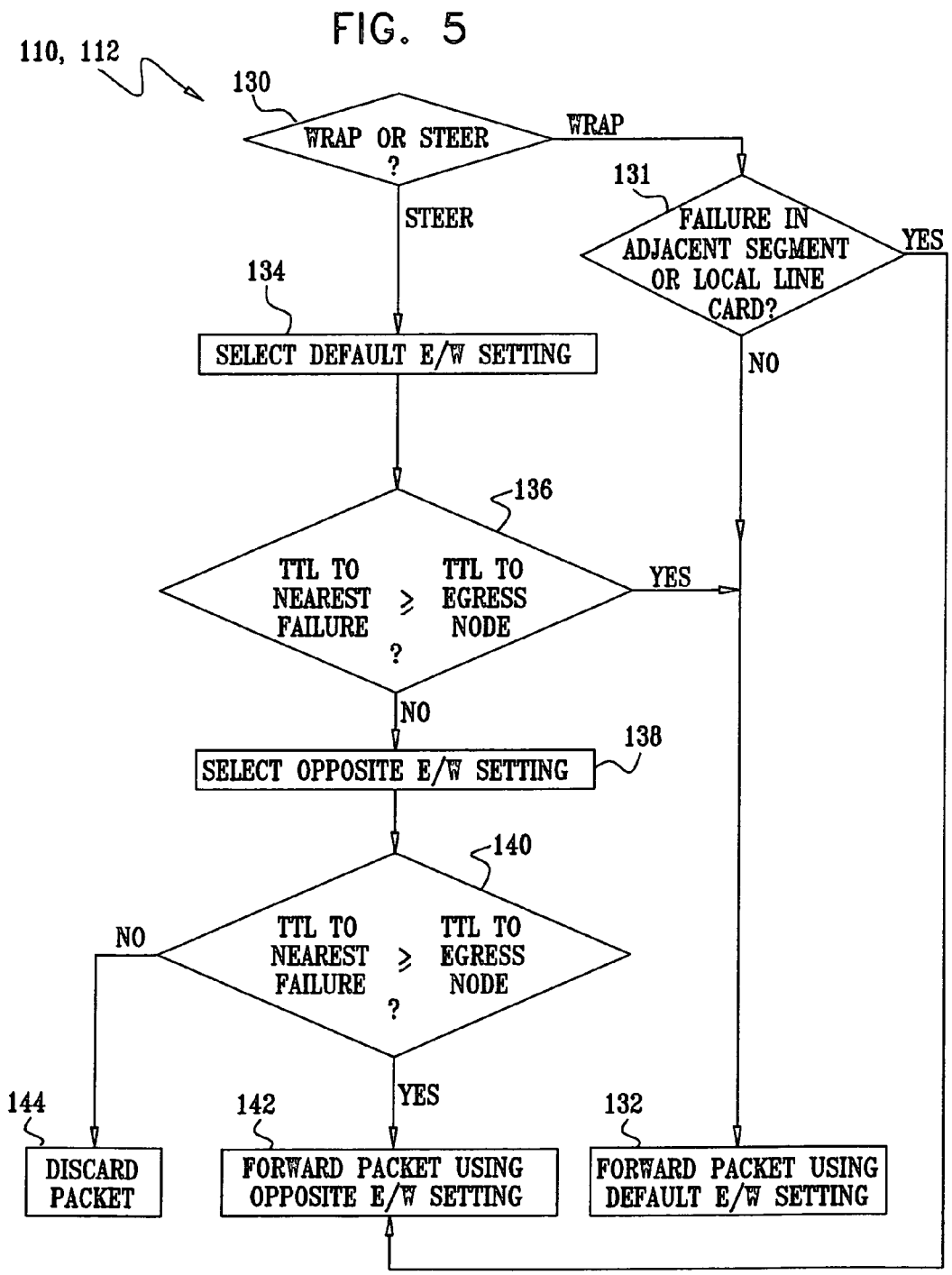
FIG. 5 is a flow chart that schematically illustrates a method for selecting a direction for forwarding a packet, in accordance with an embodiment of the present invention.

FIG. 5 is a flow chart that schematically illustrates a method for selecting a direction (i.e., ringlet) for forwarding a packet, in accordance with an embodiment of the present invention. The method of FIG. 5 can be used as a possible implementation of steps 110 and 112 of the method of FIG. 4 above. The method begins after NP 58 of the ingress card has selected the ring over which to forward the packet to the egress node.

Generally, RPR networks support two protection modes in case of failure, referred to as steer and wrap. In steer mode, if a failure is known to exist between the ingress and egress nodes along the default direction, the packet is forwarded in the opposite direction. In wrap mode, the ingress node typically forwards packets in the default direction, regardless of the existence or non-existence of a failure. The last ring node before the faulty segment reverses the direction of the packet and sends it around over the opposite direction ringlet.

In some embodiments, an additional "center wrap" mode is defined as a sub-mode of the wrap protection mode. In center wrap, if the faulty segment is the segment immediately adjacent to the ingress node along the default direction, the packet is forwarded in the opposite direction. The description that follows assumes that center wrap mode is supported.

NP 58 checks whether the protection mode defined for the packet is wrap or steer, at a protection mode checking step 130. If wrap mode is defined, NP 58 checks whether a failure is known to exist in the ring segment immediately adjacent to the ingress node along the default direction, or in the line card 40 assigned to handle this direction, at an adjacent failure checking step 131.

If no such failure is known to exist, NP 58 forwards the packet according to the default direction, at a default forwarding step 132. If an adjacent failure does exist, NP 58 forwards the packet according to the opposite direction at an opposite forwarding step 142. Returning to protection mode checking step 130 above, If steer mode is defined for the packet, NP 58 initially selects the default direction, at a default selection step 134.

NP 58 queries failure status table 82 to obtain a TTL value indicating the distance (i.e., the number of segments) to the nearest failure along the default direction. This value is denoted TTL_FAILURE. NP 58 queries nominal connectivity table 74 to obtain a TTL value indicating the distance to the egress node along the default direction, denoted TTL_EGRESS. In some embodiments, TTL_EGRESS may be already known to NP 58 after classifying the packet.

NP 58 compares TTL_FAILURE with TTL_EGRESS, at a default distance comparison step 136. If TTL_FAILURE≧TTL_EGRESS, the faulty segment is further away than the egress node, therefore the faulty segment does not prevent the packet from reaching the egress node. If this is the case, NP 58 forwards the packet according to the default direction at step 132.

If, on the other hand, TTL_FAILURE<TTL_EGRESS, the faulty segment is located between the ingress and egress nodes along the default direction. If this is the case, the packet cannot reach the egress node using the default direction. Thus, NP 58 selects the opposite direction setting, at an opposite selection step 138.

NP 58 queries tables 74 and 82 in order to obtain respective TTL_EGRESS and TTL_FAILURE values along the opposite direction. NP 58 compares the opposite direction TTL_FAILURE and TTL_EGRESS values, at an opposite distance comparison step 136. If TTL_FAILURE≧TTL_EGRESS, the faulty segment is further away than the egress node along the opposite direction. Thus, NP 58 forwards the packet according to the opposite direction at opposite forwarding step 142.

If, on the other hand, TTL_FAILURE<TTL_EGRESS, the faulty segment is located between the ingress and egress nodes along the opposite direction. In this case, which typically indicates the existence of two separate failures, the packet cannot reach the egress node using neither the default direction nor the opposite direction. NP 58 discards the packet and may issue a failure message, at a failure step 144.

In some cases, some packets may have no predefined protection mode, or may be defined as unprotected. In some embodiments, if a packet has no predefined protection mode or is defined as unprotected, the network processor of the ingress card can first compare the TTL_FAILURE and TTL_EGRESS of the default direction. If, according to the TTL value comparison, a failure exists in a segment between the ingress and egress nodes, the packet is discarded.

When network 20 is re-configured, a ring node can be added to or removed from the network. Obviously, at least some of the TTL values in tables 74 and 82 are no longer valid after such a network modification, and the tables should be updated. There is some probability, however, that a particular packet is being processed in parallel to the table updating process, so that it is processed after table 74 is updated and before table 82 is updated, or vice versa. Such an event may cause an erroneous forwarding decision. To prevent such errors, in some embodiments, NP 58 comprises two sets of tables 74 and 82, denoted T1 and T2. Each packet is defined in the ingress card as being handled according to set T1 or to set T2. When a table update is required, one set is updated while packets are processed according to the other set. Then, the two sets are switched synchronously.

Topology Management in LAG-RPR

According to the IEEE 802.17 standard, ring nodes transmit topology messages over the ring. Ring nodes receive and analyze the topology messages sent by other ring nodes and use the information conveyed by the messages to figure out the current ring topology. Typically, topology messages sent over a particular ringlet comprise the IP address and MAC address of the originating ring node. Each message also carries a TTL value that is initially set by the originating node to a predetermined initial value. Each node receiving the topology message decrements the TTL value carried by the message before continuing to forward the message around the ring. Thus, any ring node receiving the topology message can use the TTL value to determine its distance (i.e., number of segments) from the originating node along the ringlet on which the message was received.

The IEEE 802.17 standard allows for proprietary extending the topology messages using proprietary type length value (TLV) fields. In some embodiments of the present invention, the topology messages sent by the ring nodes of LAG-RPR network 20 are extended to comprise additional, LAG-RPR-related information. The additional information is used by the ring nodes to update look-up tables 74 and 82 and to identify topology-related events and faults.

In some embodiments, each RPR unit 38 (which handles a particular ring 28) is assigned a physical RPR unit MAC address, which uniquely identifies the RPR unit in the specific ring. The RPR unit MAC address is typically used for topology discovery at the ring level. Additionally or alternatively, each node selects or is configured with a LAG-RPR MAC address, which identifies the node for data forwarding purposes. Additionally or alternatively, each ring node 24 is assigned an additional IP address (denoted a LAG IP address) associated with the LAG-RPR network and unique to the ring. When a ring node sends topology messages over a particular ringlet, at least one of the RPR unit MAC address and the LAG IP address is added to the message. Additionally or alternatively, the topology messages may comprise a ring identifier number identifying the ring on which the message is sent out of the different rings 28.

A ring node receiving the extended topology messages can use the LAG-RPR-related information to identify various fault conditions. For example, assume that a configuration error caused one or more rings to be associated with the LAG-RPR network in one ring node and as independent rings in another ring node. Since any topology message associated with the LAG-RPR network carries the LAG IP address of the originating node, the node receiving the message can identify this situation by detecting a message carrying an IP address associated with the LAG-RPR network that arrives on an independently-defined ring, and vice versa.

As another example, an installation error at a particular ring node may cause a ring segment 36 to be connected to the wrong RPR unit 38. For example, two rings may be crossed with one another. The node receiving the message can identify this situation using the RPR unit MAC ID carried by the topology messages.

Bandwidth Management

As noted above, network 20 may comprise a bandwidth broker (BWB) 66, which handles bandwidth allocation and CAC functions at the LAG-RPR level. Typically, BWB 66 has full visibility of the topology of network 20 and the available bandwidth in the different segments 36 of the LAG-RPR network. For example, the BWB may maintain a table or other suitable data structure holding the currently-available bandwidth in each ring segment. In some embodiments, when network 20 comprises a ring common to all ring nodes, communication with BWB 66 is performed over the common ring.

Figure 6:
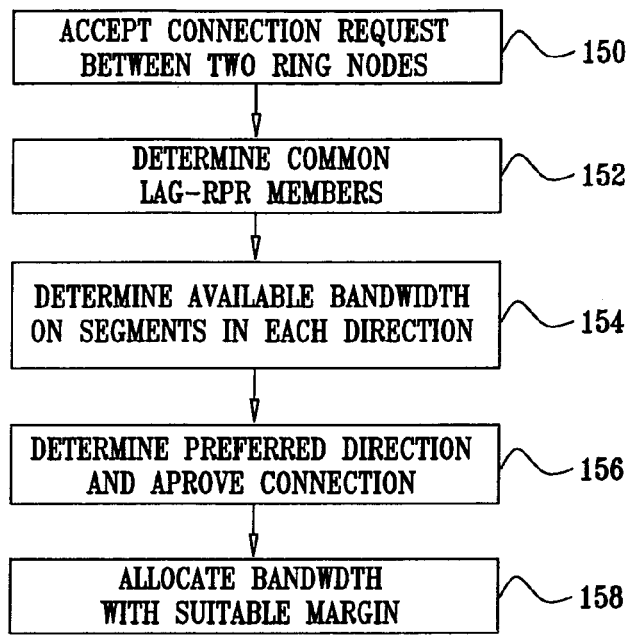
FIG. 6 is a flow chart that schematically illustrates a method for bandwidth management in a high capacity ring network, in accordance with an embodiment of the present invention.
Figure 7:
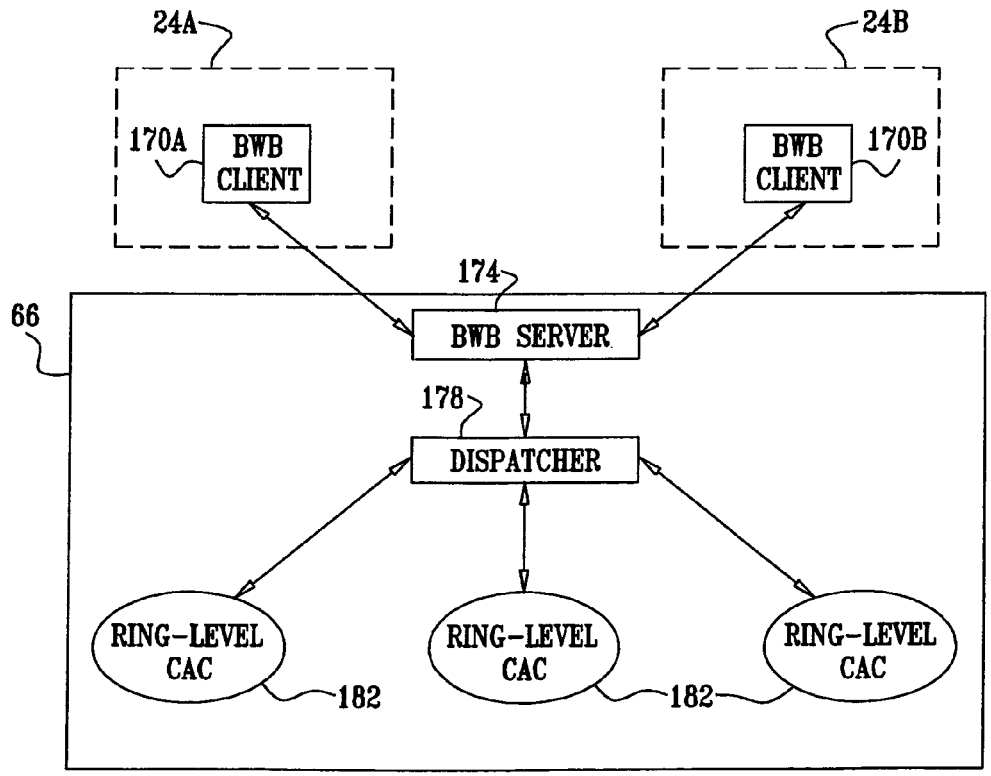
FIG. 7 is a block diagram that schematically illustrates a bandwidth broker (BWB), in accordance with an embodiment of the present invention.

FIG. 6 is a flow chart that schematically illustrates a method for bandwidth management in LAG-RPR network 20, in accordance with an embodiment of the present invention. The method is carried out by bandwidth broker (BWB) 66. The method begins with BWB 66 accepting a request to set up a connection between an ingress node and an egress node of network 20, at a request acceptance step 150. The request may be initiated, for example, by a system operator who is in the process of adding a configuration of a new connection that traverses network 20, or by a resource reservation protocol (RSVP) path request that creates an MPLS tunnel via the ring. The request typically comprises the identity of the ingress and egress nodes, and a requested bandwidth allocation.

BWB 66 identifies the subset of LAG-RPR members (i.e., a subset of rings 28) that are common to both the ingress and egress nodes, at a member identification step 152. The BWB then determines the available bandwidth on the segments of each ringlet of the common members, at a bandwidth availability checking step 154.

Assuming sufficient bandwidth is available on all of the ringlets of one of the common members, BWB 66 selects a preferred direction (ringlet) and approves the setting up of the connection over the selected direction, at an approval step 156. The preferred direction may comprise the ringlet having the maximum available bandwidth, the shortest path, or any other operator-defined criterion. If no sufficient bandwidth is available in the rings common to the ingress and egress nodes, the BWB refuses the setting up of the connection. The BWB may also suggest a different direction in each of the common rings, in order to better balance the load over the ring.

If the new connection is approved, BWB 66 allocates bandwidth to the connection over the segments of the ringlets in the selected direction on all common members, at a bandwidth allocation step 158. As noted above, packets associated with the connection will subsequently be hashed among the common members, so that all packets belonging to a particular flow are forwarded over the same member. Typically, BWB 66 divides the requested bandwidth allocation by the number of common members to produce the desired bandwidth allocation in each member. In some embodiments, BWB 66 adds a suitable margin to the bandwidth allocated in each member to account for deviations from uniform packet distribution by the hashing function.

In embodiments in which non-uniform (weighted) hashing is supported, BWB 66 distributes the requested bandwidth allocation among the common rings based on the hashing weights.

FIG. 7 is a block diagram that schematically illustrates an exemplary implementation of bandwidth broker 66, in accordance with an embodiment of the present invention. In the example of FIG. 7, bandwidth allocation is performed using a client-server configuration. In this configuration, each ring node comprises a BWB client, which sends bandwidth requests originating from the node. FIG. 7 shows two BWB clients 170A and 170B in ring nodes 24A and 24B, respectively.

BWB 66 comprises a BWB server 174, which accepts the bandwidth requests sent by the BWB clients and responds with bandwidth allocation or refusal messages. A LAG dispatcher 178 dispatches the requests to two or more ring-level CAC modules 182, each associated with one of rings 28. Each module 182 comprises a self-contained RPR CAC module, which performs bandwidth allocation functions on the corresponding ring 28. In some embodiments, each module 182 maintains a table holding the reference topology of its assigned ring. Typically, server 174, dispatcher 178 and modules 182 comprise software processes or threads running on the processor of the ring node hosting BWB 66.

In a typical bandwidth allocation transaction, BWB server accepts a bandwidth allocation request from one of the BWB clients. The LAG dispatcher determines the subset of rings over which to allocate the bandwidth (the rings common to the ingress and egress nodes) and converts the allocation request into ring-level bandwidth allocation requests in the individual rings in the subset of common rings. If uniform hashing is used, the requested bandwidth is divided equally among the common rings, often with the addition of a suitable margin.

When non-uniform (weighted) hashing is used, the dispatcher divides the requested bandwidth according to the weights. In some embodiments, the BWB clients originating the request may send a set of suggested weights to be used for non-uniform hashing.

The dispatcher then sends the ring-level requests to the individual ring-level CAC modules. Each ring-level CAC module verifies that sufficient bandwidth is available in the individual ring, and responds to the dispatcher with an allocation or refusal message. In some embodiments, BWB 66 approves the LAG-RPR-level request only if all common rings approve the respective ring-level requests.

In some embodiments, BWB 66 can be configured to allow automatic ringlet selection, i.e., each ring-level CAC module may independently suggest a preferred ringlet for allocating the bandwidth.

In some embodiments, dispatcher 178 may be implemented as part of the BWB client, i.e. the client may dispatch multiple requests to multiple ring-level CAC modules 182. In these embodiments, the dispatcher in the BWB client operates in a similar manner to the dispatcher within the BWB server.

Although the embodiments described herein mainly address LAG-RPR networks comprising rings conforming to the IEEE 802.17 standard, the methods and systems described herein can also be used to construct and operate high capacity network interfaces for shared media, such as Ethernet interfaces connected to a shared medium.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
configuring a plurality of ring nodes to communicate over a communication network comprising at least three communication rings in a concentric layout, each ring comprising two unidirectional ringlets in mutually-opposite directions, wherein at least two ring nodes are each connected to at least three of the communication rings;
accepting a data packet comprising one or more header fields at an ingress ring node;
determining an egress ring node to which the data packet is to be forwarded by the ingress ring node;
identifying a subset of the rings comprising one or more common rings that are connected to both the ingress and egress ring nodes;
responsively to a respective value of at least one of the header fields of the packet, selecting a ringlet of a ring among the one or more common rings; and
forwarding the data packet from the ingress ring node to the egress ring node over the selected ringlet.

2. The method according to claim 1, wherein configuring the plurality of ring nodes comprises connecting at least one of the ring nodes to only part of the rings.

3. The method according to claim 1, wherein selecting the ringlet of the ring among the one or more common rings comprises applying a hashing function to the respective value of the at least one of the header fields of the packet.

4. The method according to claim 1, wherein determining the egress node comprises adaptively maintaining associations between media access control (MAC) addresses of potential destination nodes and respective egress nodes via which data packets are to be forwarded to the potential destination nodes, extracting a destination node MAC address value from the data packet and determining the egress node responsively to an association corresponding to the extracted destination node MAC address value.

5. The method according to claim 1, wherein identifying the one or more common rings comprises querying a topology of the communication network stored in a data structure in the ingress node.

6. The method according to claim 1, wherein selecting the ringlet comprises choosing a default ringlet out of the two unidirectional ringlets of the ring, and switching to the other of the two unidirectional ringlets when detecting a failure along a part of the default ringlet connecting the ingress node to the egress node.

7. The method according to claim 6, wherein switching to the other of the two unidirectional ringlets comprises determining whether to switch to the other of the two unidirectional ringlets responsively to a protection mode defined for the data packet.

8. The method according to claim 6, wherein detecting the failure comprises determining a first number of ring segments from the ingress node to a location of the failure and a second number of segments from the ingress node to the egress node, and determining that the failure is located between the ingress node and the egress node when the first number of segments is smaller than the second number of segments.

9. The method according to claim 1, wherein identifying the one or more common rings and selecting the ringlet comprise querying at least one of a first data structure holding a reference topology of the communication network and a second data structure holding topology information regarding known failures in the communication network.

10. The method according to claim 9, wherein querying the at least one of the first and second data structures comprises, when modifying a topology of the communication network, forwarding data packets in accordance with the first and second data structures while storing an updated reference topology in a third data structure and storing an updated topology information regarding the known failures in a fourth data structure, and forwarding subsequent data packets using the third and fourth data structures.

11. The method according to claim 1, and comprising periodically sending from each of the ring nodes topology messages enabling other ring nodes to determine the topology of the communication network and to detect topology-related faults, each topology message comprising at least one of a media access control (MAC) address uniquely identifying an RPR unit assigned to a ring on which the message is sent within the ring on which the message is sent, a LAG-RPR MAC address uniquely identifying the ring node sending the topology message, an Internet protocol (IP) address uniquely identifying the communication network, and a ring number identifying the ring on which the message is sent.

12. The method according to claim 1, and comprising, prior to accepting the data packet, allocating bandwidth in the one or more common rings connected to both the ingress and egress ring nodes.

13. The method according to claim 12, wherein allocating the bandwidth comprises choosing one of the two unidirectional ringlets in each of the one or more common rings having a default direction, based on available bandwidth in the ringlets of the one or more common rings.

14. The method according to claim 12, wherein allocating the bandwidth comprises:
accepting a bandwidth allocation request sent by the ingress ring node;
translating the bandwidth allocation request to one or more ring-level requests requesting bandwidth allocation in the respective one or more common rings; and
allocating the bandwidth responsively to approval of the one or more ring-level requests.

15. A communication network, comprising:
at least three communication rings in a concentric layout, each comprising two unidirectional ringlets oriented in mutually-opposite directions; and
a plurality of ring nodes connected by the rings, wherein at least two ring nodes are each connected to at least three of the communication rings, and wherein each ring node is arranged to accept a data packet comprising one or more header fields, to determine an egress ring node to which the data packet is to be forwarded, to identify a subset of the rings comprising one or more common rings that are connected to both the ring node and the egress ring node, to select, responsively to a respective value of at least one of the header fields of the packet, a ringlet of a ring among the one or more common rings, and to forward the data packet to the egress ring node over the selected ringlet.

16. The network according to claim 15, wherein at least one of the ring nodes is not connected to all the rings.

17. The network according to claim 15, wherein each ring node is arranged to select the ring among the one or more common rings by applying a hashing function to the respective value of the at least one of the header fields of the packet.

18. The network according to claim 15, wherein each node is arranged to adaptively maintain associations between media access control (MAC) addresses of potential destination nodes and respective egress nodes via which data packets are to be forwarded to the potential destination nodes, to extract a destination node MAC address value from the data packet, and to determine the egress node responsively to an association corresponding to the extracted destination node MAC address value.

19. The network according to claim 18, wherein each ring node comprises a data structure holding a topology of the communication network, and wherein each node is arranged to identify the one or more common rings by querying the topology.

20. The network according to claim 15, wherein each ring node is arranged to select the ringlet by choosing a default ringlet out of the two unidirectional ringlets and switching to the other of the two unidirectional ringlets when detecting a failure along a part of the default ringlet connecting the ring node to the egress node.

21. The network according to claim 20, wherein each ring node is arranged to determine whether to switch to the other of the two unidirectional ringlets responsively to a protection mode defined for the data packet.

22. The network according to claim 20, wherein each ring node is arranged to determine a first number of ring segments from the ring node to a location of the failure and a second number of segments from the ring node to the egress node, and to determine that the failure is located between the ring node and the egress node when the first number of segments is smaller than the second number of segments.

23. The network according to claim 15, wherein each ring node comprises at least one of a first data structure holding a reference topology of the communication network and a second data structure holding topology information regarding known failures in the communication network, and wherein each ring node is arranged to query the at least one of the first and second data structures so as to identify the one or more common rings and select the unidirectional ringlet.

24. The network according to claim 23, wherein each ring node is arranged, when modifying a topology of the communication network, to forward data packets in accordance with the first and second data structures while storing an updated reference topology in a third data structure and storing an updated topology information regarding the known failures in a fourth data structure, and to forward subsequent data packets using the third and fourth data structures.

25. The network according to claim 24, wherein each ring node is arranged to periodically send topology messages enabling other ring nodes to determine the topology of the network and to detect topology-related faults, each topology message comprising at least one of a media access control (MAC) address uniquely identifying an RPR unit assigned to a ring on which the message is sent within the ring on which the message is sent, a LAG-RPR MAC address uniquely identifying the ring node sending the topology message, an Internet protocol (IP) address uniquely identifying the communication network and a ring number identifying the ring on which the message is sent.

26. The network according to claim 15, wherein one of the ring nodes is arranged to allocate bandwidth in the one or more common rings.

27. The network according to claim 26, wherein the one of the ring nodes arranged to allocate the bandwidth is arranged to choose one of the two unidirectional ringlets in each of the one or more common rings having a default direction, based on available bandwidth in the ringlets of the one or more common rings.

28. The network according to claim 26, wherein the one of the ring nodes arranged to allocate the bandwidth is arranged to accept a bandwidth allocation request sent by the ingress ring node, to translate the bandwidth allocation request to one or more ring-level requests requesting bandwidth allocation in the respective one or more common rings, and to allocate the bandwidth responsively to approval of the one or more ring-level requests.

29. A ring node for use in a communication network that includes at least three communication rings in a concentric layout, each including two unidirectional ringlets oriented in mutually-opposite directions, the ring node connected to at least three of the communication rings all of which are connected to a second node, the ring node comprising:

at least three line cards, which are arranged to communicate with the respective at least three communication rings; and a network processor, which is arranged to accept a data packet comprising one or more header fields, to determine an egress ring node to which the data packet is to be forwarded, to identify a subset of the concentric rings comprising one or more common rings that are connected to both the ring node and the egress ring node, to select, responsively to a respective value of at least one of the header fields of the data packet, a ringlet of a ring among the one or more common rings, and to forward the data packet to the egress ring node over the selected ringlet.

* * * * *